Sept. 8, 1964  A. C. LAPINE  3,147,994
SWING-OUT VEHICLE SEAT
Filed April 18, 1961  2 Sheets-Sheet 1
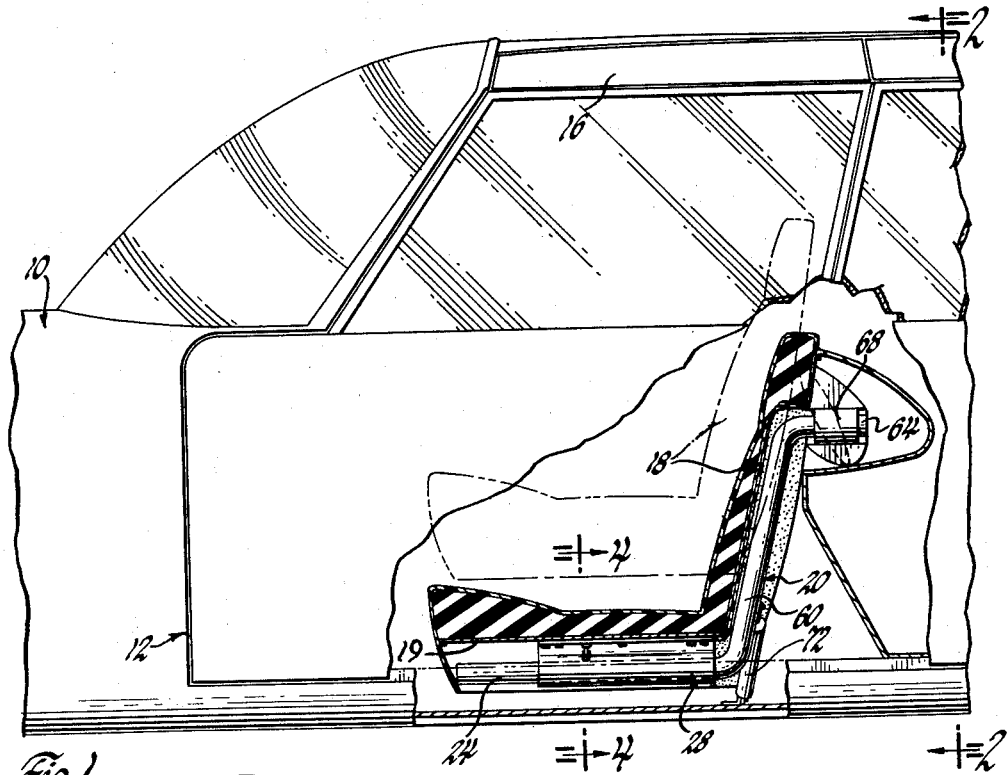
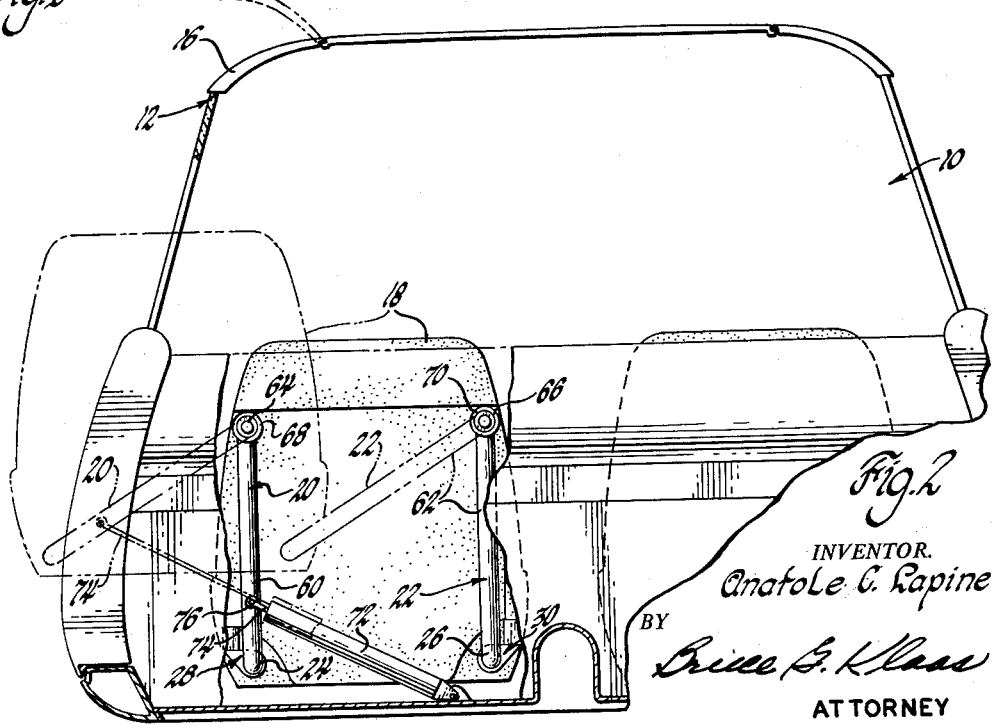
INVENTOR.
Anatole C. Lapine
BY
ATTORNEY Sept. 8, 1964　　　A. C. LAPINE　　　3,147,994
SWING-OUT VEHICLE SEAT
Filed April 18, 1961　　　2 Sheets-Sheet 2
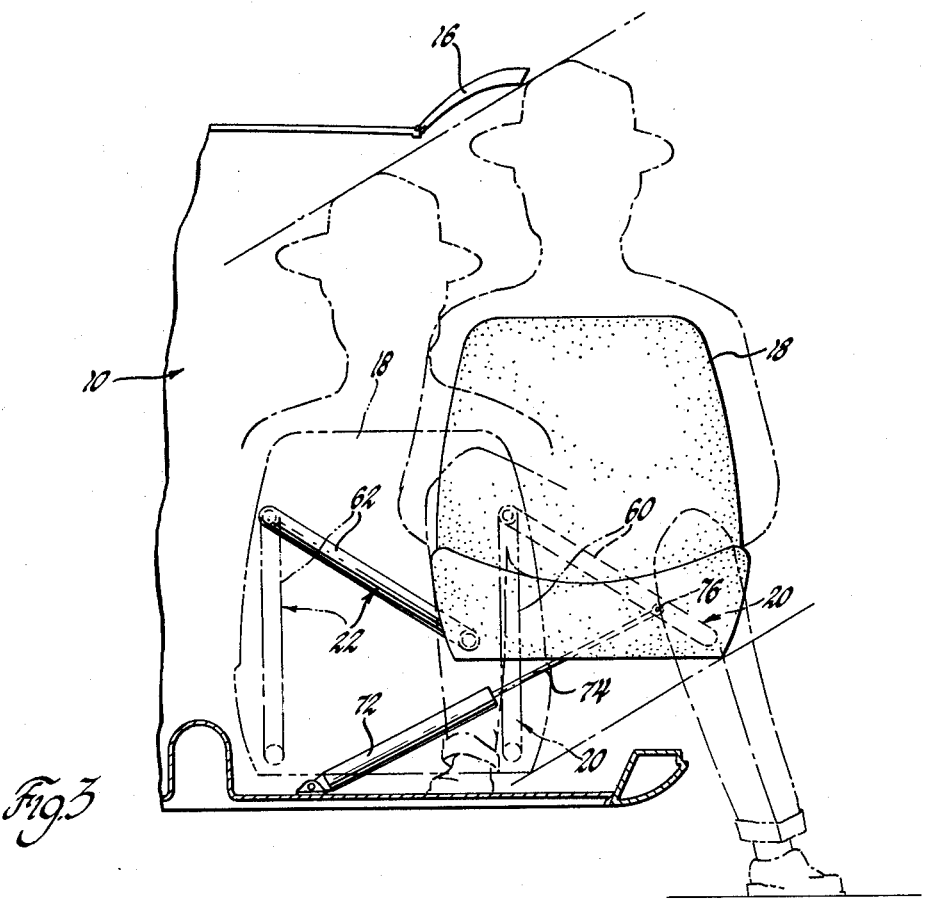
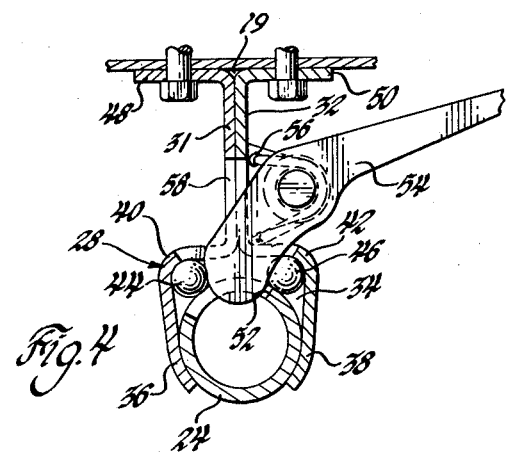
INVENTOR.
Anatole C. Lapine
BY
　　ATTORNEY

United States Patent Office 3,147,994
Patented Sept. 8, 1964

3,147,994
SWING-OUT VEHICLE SEAT
Anatole C. Lapine, Detroit, Mich., assignor to General Motors Corporation, Detroit, Mich., a corporation of Delaware
Filed Apr. 18, 1961, Ser. No. 103,837
4 Claims. (Cl. 296—65)

This invention relates to a vehicle seat and more particularly to an upwardly outwardly swinging automobile seat which is movable from a normal occupant seating position within a vehicle to an occupant receiving and discharging position without the vehicle.

The trend in the automobile industry toward low level automobiles has made ingress and egress from vehicles more and more difficult. It has been proposed that vehicle seats be provided with swing-out mechanism so that the seat may be moved from a normal driving position spaced closely adjacent the vehicle floor to a position spaced upwardly and outwardly thereof. A variety of complicated arrangements for sliding a vehicle seat laterally through a vehicle doorway and then jacking the seat vertically have been previously provided. As may be readily appreciated, such mechanisms are cumbersome, expensive and require a plurality of control elements.

It is, therefore, an object of this invention to provide vehicle seat control apparatus for positioning a vehicle seat upwardly and outwardly of the normal riding position. An additional object of this invention is to provide a vehicle seat which is swingable from a position within the vehicle to a position without the vehicle. A further object of this invention is to provide improved seat positioning mechanism integrated with a swingable vehicle seat.

Other objects and advantages of the invention will be apparent from the following description and from the accompanying drawings in which:

FIGURE 1 is a side elevational view, partly in section, of a preferred embodiment of the invention;

FIGURE 2 is an end view of the apparatus shown in FIGURE 1;

FIGURE 3 is an end view illustrating the relationship of the apparatus to a seat occupant; and FIGURE 4 is a cross sectional view of adjuster mechanism of the apparatus taken along the line 4—4 in FIGURE 1.

In low-slung vehicles the roof is often so low that it is difficult to enter and leave the car. In the automobile illustrated in the drawings, ingress to and egress from the car is facilitated by a roof closure panel hingedly mounted in the roof adjacent each conventional side door and by a seat member which is swingable sideways in an upwardly and outwardly arc. Control means may be arranged so that, when the side door is open and the seat is actuated, the roof closure is simultaneously opened as disclosed in United States Patent 2,809,862. In the automobile illustrated there are two roof closures, one at each side adjacent the respective side doors. Only the left-hand side of the vehicle and the left-hand seat are illustrated and described inasmuch as both sides of the automobile are similar.

Referring now to the drawings, an automobile having a body designated generally as 10 with a side door opening 12 and a hinged roof closure 16 is illustrated. A seat member 18, mounted on a seat support frame 19, is supported by spaced tubular members 20, 22 comprising lower forwardly extending substantially horizontal portions 24, 26 which are rotatably and slidably supported within housings 28, 30. Referring now to FIGURE 4, each of the housings 28, 30 is formed by plate members 31, 32 which are welded or otherwise secured to one another. The lower portions of the plates of the housing 28 are outwardly bent to form a tube pocket 34 and the lower end portions 36, 38 of the plates are inwardly curved to provide a slide seat for the tube 24. In order to permit horizontal adjustment of the seat 18, the upper portions 40, 42 of the pocket 34 are suitably dimensioned and formed to provide a bearing cup in which bearing members 44, 46 are received to permit sliding movement of the tube 24 relative to the housing 28. Flanges 48, 50 are provided on the upper ends of the plates 31, 32 to permit the housing 28 to be fastened to the bottom of the seat frame 19 in any conventional manner. Locking means for the horizontal adjusting means consists of a plurality of slots 52 provided in the top surface of the tube 24 and a spring biased lock bar 54 pivotally mounted on a flange 56 for movement of a portion thereof into and out of locking engagement with the slots 52 through an opening 58 provided in the housing 28. Although a preferred housing arrangement has been illustrated for supporting the tube portions 24, 26, it is to be understood that the adjuster mechanism may be eliminated and other housing devices may be provided which rotatably support the seat 18 relative to the tube portions 24, 26 if desired.

The tubular members 20, 22 further comprise downwardly depending support portions 60, 62 which are integrally connected at the lower ends thereof to the rear ends of the forwardly extending tube portions 24, 26. The upper ends of the support portions 60, 62 are integrally connected to the front ends of rearwardly extending pivotally supported portions 64, 66. Suitable bearing housings 68, 70 are fixed to adjacent body structure of the vehicle and rotatably support the rearwardly extending portions 64, 66 in any conventional manner. The tubular members 20, 22 are identically dimensioned and the support housings thereof are positioned in the same horizontal planes so that the seat 18 is maintained in a horizontal position at all times. An electric motor or servomotor 72 is fixedly supported relative to the seat member 18 and has a connecting rod 74 pivotally attached to one of the tubular members 20, 22 as at 76. Suitable control mechanism is provided adjacent the vehicle seat to actuate the motor 72 and drive the seat 18 sideways in an arcuate path between the normal lower position and the upwardly outwardly displaced position shown in FIGURE 3. The control mechanism may be suitably integrated with the vehicle door and the roof closure panel as disclosed in United States Patent 2,809,862. It should be appreciated that a single pivotal suport arm might be located centrally of the seat member 18 to eliminate one of the tubular members 20, 22 in some constructions.

It is comprehended that various changes and modifications may be made within the scope of this invention as defined by the appended claims.

I claim:

1. In a vehicle body having a floor and a side door opening therein, a vehicle seat mechanism comprising a forward facing seat member, a seat support frame, lower bearing means fixed to said support frame, upper bearing means parallelly spaced upwardly and rearwardly of said lower bearing means, said upper bearing means being parallel to said floor and to the plane of said door opening, support means rotatably supported in and extending between said upper bearing means and said lower bearing means, power means to swing said seat member on said support means sideways in an arc upwardly and outwardly about said upper bearing means, means for adjusting said seat horizontally in a fore and aft direction on said support means and manually operated locking means for securing said seat from fore and aft movement on said support means by said horizontal adjusting means.

2. In a vehicle body having a floor and a side door opening therein, a vehicle seat mechanism comprising a forward facing seat member, a seat support frame, a lower bearing member fixed to said seat support frame, an upper bearing member secured to said body and parallelly spaced upwardly and rearwardly of said lower bearing member, said upper bearing member being fixedly secured to a portion of said vehicle body and being parallel to said floor and the plane of said door opening, a support arm, an upper and rearwardly extending portion of said support arm being rotatably supported by said upper bearing member, a lower and forwardly extending portion of said support arm being rotatably and longitudinally slidably supported within said lower bearing member, power means to swing said seat member on said support arm sideways in an arc upwardly and outwardly about said upper bearing member, means for slidably adjusting said seat horizontally in a fore and aft direction on said lower portion of said support arm, and manually operated locking means to secure said horizontal adjusting means.

3. In a vehicle body having a floor and a side door opening therein, a seat mechanism comprising a forward facing seat, a seat support frame for supporting said seat, a lower bearing member fixed to said seat support frame, an upper bearing member parallelly spaced upwardly and rearwardly of said lower bearing member, said upper bearing member being fixedly secured to a portion of said vehicle body, said bearing members being substantially parallel to said floor and the plane of said door opening, a support arm, an upper and rearwardly extending portion of said support arm being rotatably supported by said upper bearing member, a lower and forwardly extending portion of said support arm being rotatably supported within said lower bearing member, and power means to swing said seat on said support arm in a sideways arc upwardly and outwardly about said upper bearing member for moving said seat sideways through said vehicle door opening.

4. In a vehicle body having a floor and a side door opening therein, a forward facing vehicle seat, a seat frame, a seat support comprising a lower horizontal extension, fastener means to secure said seat to said lower horizontal extension, an upper horizontal extension, a pivotal support secured to said body and rotatably supporting said upper horizontal extension, said pivotal support being substantially parallel to said floor and the plane of said door opening, an upwardly extending support bar interconnecting said spaced horizontal extensions and power means to oscillate said seat sideways in an arcuate path about said pivotal support from a position closely adjacent said vehicle floor to a position outwardly and upwardly spaced therefrom through said vehicle door opening.

References Cited in the file of this patent

UNITED STATES PATENTS

| | | |
|---|---|---|
| 2,641,305 | Oishei | June 9, 1953 |
| 2,697,475 | Dueth | Dec. 21, 1954 |
| 2,747,652 | Marsh | May 29, 1956 |
| 2,753,947 | Mach | July 10, 1956 |
| 2,864,431 | Eaton | Dec. 16, 1958 |
| 2,946,373 | McCanse et al. | July 26, 1960 |

FOREIGN PATENTS

| | | |
|---|---|---|
| 1,241,658 | France | Aug. 8, 1960 |